March 14, 1950     E. P. BULLARD, III     2,500,797
POSITIONING APPARATUS
Filed March 24, 1947

INVENTOR.
EDWARD P. BULLARD, III
BY
Paul M. Geist
ATTORNEY

Patented Mar. 14, 1950

2,500,797

UNITED STATES PATENT OFFICE 2,500,797

POSITIONING APPARATUS

Edward P. Bullard, III, Fairfield, Conn., assignor to The Bullard Company, a corporation of Connecticut Application March 24, 1947, Serial No. 736,702

31 Claims. (Cl. 60—52)

This invention relates to apparatus for automatically positioning a member along a path of travel. It deals with subject matter similar to that shown, described and claimed in application Serial Number 736,703, filed March 24, 1947, in the name of Edward P. Bullard, III.

The above-identified application discloses a movable member, termed a primary means, that is adapted automatically to be positioned, in accordance with a desired selection, at any one at a time of more than two locations along a path of travel. In that case, the primary means was moved, at a relatively rapid speed, to an intermediate location, from which it was moved at a relatively slow speed to the final, selected location. A condition arose in that case when the primary means initially was located on the same side of the final, selected location as the intermediate location, requiring the introduction of an additional rapid movement of the primary means serving to move it from the side of the final, selected location opposite that from the intermediate location to the proper side thereof prior to moving it at a relatively slow speed to the final, selected location.

An object of the present invention is to provide an apparatus which will require only a unidirectional relatively rapid movement of the primary means to the intermediate location regardless of the side of the final, selected location on which it initially rests, and when said primary means initially does not lie between the intermediate and final, selected locations; and effect a relatively slow rate of movement of the primary means from the intermediate location to the final, selected location, and when said primary means initially lies between said locations.

In the above-referred-to application, a detector circuit is employed that involves the use of circuit-actuating strips having a length at least equal to the length of the path of travel of the primary means and adjustable therethroughout, requiring a guiding and supporting means of a length at least twice that of the path of travel of the primary means.

Another object of this invention is the provision of such an apparatus wherein the detector circuit employs adjustable circuit-actuating means requiring a length only slightly greater than that of the path of travel of the primary means.

Other objects of the invention include, the provision of such an apparatus in which the movement of the primary means for any selected location is always initiated in the correct direction by an always identical, non-selective operation; the provision of such an apparatus in which the primary means is ultimately moved to the selected location at a relatively slow speed, although it is, depending upon its initial location, moved uni-directionally at a relatively rapid speed to an intermediate location which always bears a definite relation to the finally-selected location; the provision of such an apparatus, the operation of which when initiated by a non-selective act, causes a further selection to be automatically effected so that the primary means initially moves toward the final, selected location regardless of its previous location; the provision of such an apparatus including a primary means movable in two directions along a path of travel such that it can be positioned at any pre-determined location therealong and embodying a control which when rendered effective by a non-selective act, automatically selects and initiates the correct direction of movement of the member toward the pre-determined location; and the provision of such an apparatus wherein the primary means is moved by a fluid-operated system, which manually can be operated to control the direction and speed of movement of the primary means at the will of the operator, and still embody the automatic control features singly or collectively as above set forth.

The above, as well as other objects and novel features of the invention will become apparent from the following specification and accompanying drawing, in which.

The principles of the invention are applicable to any apparatus wherein it is desired to locate a member at any one at a time of more than two locations along a path of travel. They will be described as applied to controlling the flow of liquid under pressure to each side of a piston that is attached to the primary means, although they are equally applicable to other types of drives for the primary means such as a rotary hydraulic motor for operating a screw and nut drive, or a pinion and rack drive. While the invention will be described in connection with the movement of a primary means along a single path, it is, of course, within the scope of this invention to control the movement of two primary means along separate paths such as is the case in a horizontal boring mill; or one primary means along intersecting paths such as is the case when it is desired to move the primary means universally in a single plane in the manner shown in application Serial Number 571,637, filed January 6, 1945 (now Patent No. 2,473,506) in the name of Edward P. Bullard, III.

Figure 1:
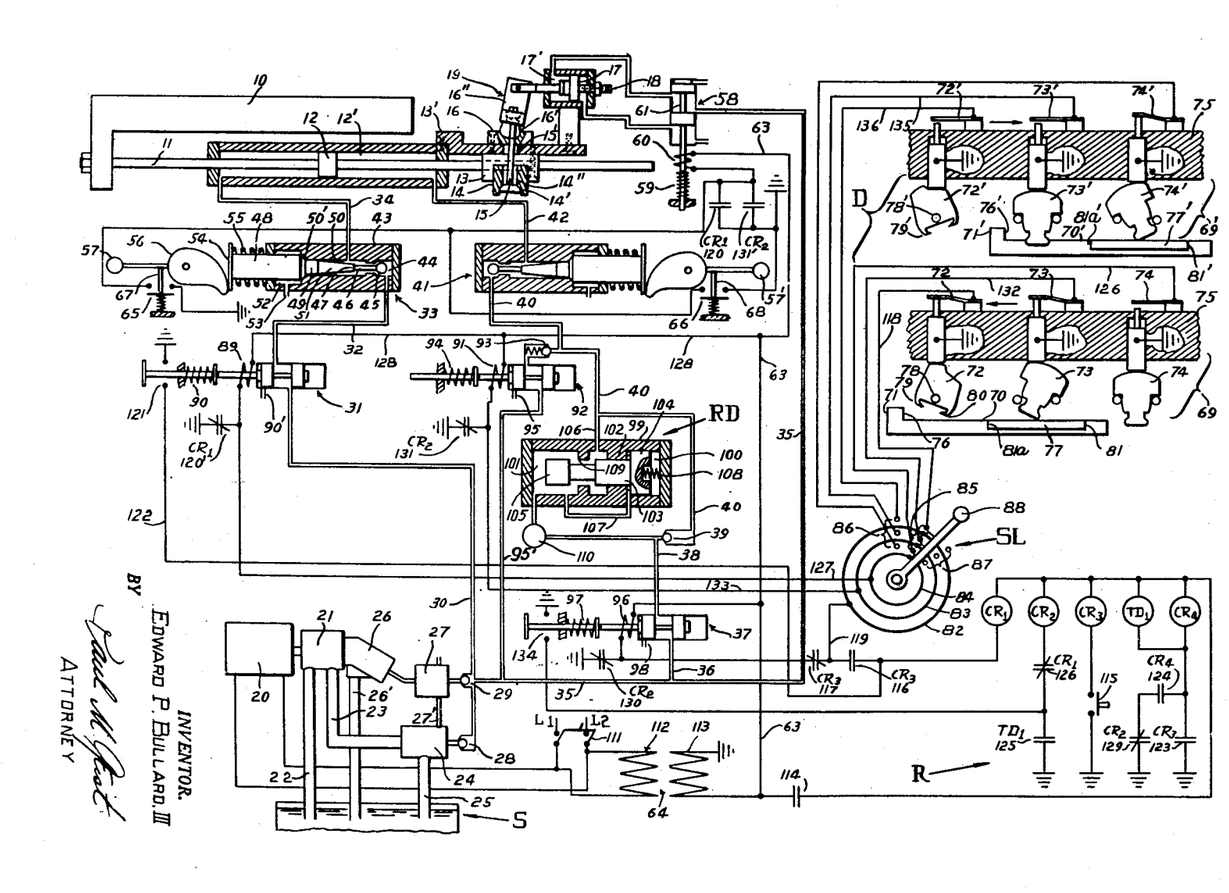
The single figure represents a schematic diagram of apparatus to which the principles of the invention have been applied.

Referring to the drawing, a primary means 10 which may be a work-supporting table, a tool support or in fact any movable member that is required to be located at more than two locations, one at a time along a path of movement, is rigidly fastened to a rod 11 extending through a cylinder 12', and to which a piston 12 is fixed for reciprocation. The rod 11 extends through and beyond the cylinder 12' and passes through a cylindrical opening in a block 13 fixed to a support 13' attached to the stationary cylinder 12'. A portion of the block 13 is cut away exposing a portion of the rod 11, and a cap 14 fits within the cut away portion and is adapted frictionally to engage the rod 11. It includes a cup-shaped recess 14' on each side of rod 11—each recess having a hole 14" therein adapted to receive a rod 15. The head of each rod 15 forms a swivel with its respective cup-shaped recess 14' and the rods 15 straddle the rod 11, extending through enlarged openings 15', formed in the support 13'.

A block 16, fixed to support 13' is provided with a spherical seat for receiving a spherical-shaped member 16' integral with a member 16". The rods 15 extend through ears on member 16" and are fastened thereto by nuts, as shown. The member 16" is attached to a piston rod containing a piston 17 within a cylinder 17'. A screw 18 is provided for limiting the angular movement of rods 15 to the right of vertical as shown. Due to the difference in radii of the swivels formed by member 16' and the heads of rods 15, slight movement of member 16" from the vertical causes cap 14 to frictionally engage rod 11. Substantial movement to either side of the vertical will release cap 14 from frictional engagement with rod 11. The screw 18 in the cylinder 17' limits the rightward movement of piston 17 to effect frictional engagement between cap 14 and rod 11, while movement of piston to the left-hand side of cylinder 17' forces the member 16" sufficiently to the left of vertical to release the cap 14 from rod 11. The apparatus just described will be referred to hereinafter as the binding device 19.

The primary means 10, in the present invention, is adapted to be moved in either direction by exhausting the side of cylinder 12' in the desired direction of motion of the primary means. This requires a liquid locked system with liquid under equal pressure acting on opposite faces of the piston 12. It is necessary to be able to move the primary means at relatively rapid traverse rates, which is best effected by employing a low-pressure large-volume hydraulic system. On the other hand it is essential to maintain a relatively high pressure on each side of piston 12 when the primary means is being held in a selected location. Accordingly, a combined low-pressure large-volume, and high-pressure small-volume system is employed.

An electric motor 20, connected across lines L₁, L₂, drives a low-pressure, large-capacity pump 21 that is supplied with liquid through an intake 22 leading from a source S. The pump 21 is provided with a delivery line 23 leading to a pressure-operated dump valve 24 that is in turn connected to the source S by a line 25. A high-pressure, low-capacity pump 26 is supplied with liquid from source S through a line 26'. It delivers liquid under pressure to a relief valve 27 set at a pre-determined pressure and in the present embodiment at about 750 pounds per square inch. A connection 27' admits high pressure liquid to dump valve 24 and the latter is set so that at a pre-determined lower pressure it functions to shunt all the liquid it receives from pump 21 to source S through line 25.

The valves 24 and 27 are connected to the system through check valves 28, 29 which prevent backward flow of liquid through valves 24 and 27 when they are not operating. Liquid under pressure flows through line 30 to a solenoid-operated valve 31, to be described later, thence through a line 32 to a manually-operable valve 33, thence through a line 34 to the left hand end of cylinder 12'. Pressure liquid also flows through a line 35, thence through a branch 36 to another solenoid valve 37, to be described later, thence through a duct 38, past a ball-check valve 39, through line 40 to another manually-operable valve 41, thence through a line 42 to the right hand end of cylinder 12'. The valves 33 and 41 are identical, and in practice are one and the same. Manually-controlled admission of liquid under pressure to, or exhaust from opposite sides of piston 12 in practice is occasioned by moving an operating handle in opposite directions. For clarity, two identical valves are shown and their operating handles are adapted to be moved in only one direction. Since valves 33 and 41 are identical, only valve 33 will specifically be described. It comprises a body 43 having a chamber 44 therein for receiving a ball-check member 45. The ball-check member 45 includes a stem 46 that is adapted to abut against the end 47 of a manually-operable valve stem 48 that is adapted to be reciprocated within body 43. When stem 48 is in the position shown, ball-check member 45 is unseated permitting liquid under pressure to be admitted to cylinder 12'. The forward portion of stem 48 includes a cylindrical portion 49, which when stem 48 is in the position shown, provides a sealing seat with a bore 50 and a chamfered surface 50' in the body 43. It also includes a conical portion 51 which when stem 48 is retracted, from its seating position a distance greater than the length of the cylindrical portion 49, effects the passage of a variable quantity of liquid to a chamber 52 that exhausts through a port 53. The stem 48 is provided with a head 54, between which and the body 43, a spring 55 is located that maintains the head 54 in engagement with an eccentric cam 56. A handle 57 is attached to cam 56 for manually controlling the movement of stem 48. Clockwise movement of handle 57 causes stem 48 to move leftwardly thereby permitting ball-check member 45 to seat and subsequently exhausting the left side of cylinder 12' at a rate depending upon the location of stem 48 in its body 43. Similarly, counter-clockwise movement of handle 57' will exhaust the righthand side of cylinder 12'. Exhausting either side of cylinder 12' will cause piston 12 and the primary means 10 to move in the direction corresponding to the side of cylinder 12' that is exhausted, except that the binding device 19 must be released prior to such movement. With the apparatus in the condition shown, liquid under pressure flows through line 35 to a valve 58 normally held in the position shown by a spring 59. In this position of valve 58 liquid is admitted to the left-hand end of cylinder 17', while the right-hand side thereof is open to exhaust. This forces piston 17 against screw 18 which maintains the binding device 19 effective—preventing the movement of the primary means 10. A solenoid 60 is provided, which when energized shifts the spool 61 of valve 58 downwardly so that pressure liquid is admitted to the right-hand side of cylinder 17', while the left-hand side thereof is exhausted. This causes the binding device to release rod 11 and permit movement of the primary means 10. One side of the solenoid 60 is connected by a conductor 63 to the one side of the secondary of a transformer 64 while the other side of said solenoid is connected in parallel relation to the one contact of each of a pair of switches 65 and 66. The other contact of each of said switches 65, 66 is connected to ground. Switches 65, 66 are normally urged toward closed position, and when the apparatus is in the position shown, they are held open by fingers, 67, 68 on the handles 57, 57'.

From the foregoing, it is evident that clockwise movement of handle 57 and counter-clockwise movement of handle 57' will permit the closing of their respective switches 65, 66. When this occurs, current flows from ground through the secondary of transformer 64, conductor 63, solenoid 60 and switches 65, 66 to ground. The construction and arrangement in practice is to combine handles 57, 57' so that only one side of cylinder 12' can be exhausted at a time.

That phase of the invention which deals with the automatic positioning of the primary means 10 at any one at a time of more than two locations along its path of travel within a cycle by controlling the admission of pressure liquid to, and exhaust from the cylinder 12' involves the cooperative action of a detector D, a selector SL and a relay circuit R.

The detector D comprises a plurality of units 69, one for each position along the path of movement of the primary means at which it is desired to be located. There may be as many units 69 as desired although twenty to thirty usually suffice for most jobs performed on such apparatus as horizontal boring mills. The units 69 in the present embodiment, include a reciprocable, manually-adjustable strip 70 that is adapted to ride in a groove extending only slightly longer than the path of travel of the primary means. The strip 70 includes a switch actuating surface 71 that can be locked in any pre-determined accurate location. The unit 69 also includes a locking switch 72 and two self-returning switches 73 and 74. Switch 72 is termed a "locking switch" because it is either open or closed and remains in either position until positively moved by an external force to the other position. Switches 73 and 74 are termed "self-returning" switches because they normally remain open and will re-open when the force is removed that is holding them closed.

Switches 72, 73 and 74 are rigidly mounted in spaced relation on an arm 75 that is attached to, and movable with the primary means 10. Arm 75, therefore, represents the location of the primary means at any instant along its path of travel. Switch 72 cooperates with surfaces 71 and 76 formed on the end of strip 70, while switches 73 and 74 cooperate with a cam 77 formed on the side of strip 70. Accordingly switches 73, 74 are themselves aligned but laterally spaced slightly from switch 72. The type of switches 73, 74 is the same as that shown, described and claimed in application Serial Number 586,799, filed on April 5, 1945, in the name of Edward P. Bullard, III, to which application reference is made for specific details. As described in the above-referred-to application, each switch is extremely thin so that a great many may be mounted on the support 75 within a relatively small space. The switch 72 includes a relatively thin body pivotally mounted on a pin 78 and possessing trip fingers 79 and 80. The finger 79 is adapted to engage surface 71 and finger 80 engages surface 76. The construction and arrangement are such that whenever the primary means 10 and arm 75 are on the right-hand side of the locating surface 71, switch 72 will always be closed, and when on the left-hand side of said surface switch 72 will always be open.

Each strip 70 is extremely thin also and consumes no more space than its cooperating switches 72, 73 and 74 so that twenty to thirty individually-adjustable strips 70 and their cooperating switches 72, 73 and 74 consume relatively little space. In the embodiment shown, only two strips 70, 70' and their cooperating switches are shown. The strip 70 is shown adjusted so that the primary means lies to the right side of the selected location defined by surface 71; while strip 70' shows the relation when the primary means is positioned to the left of the selected location.

The cam 77 is fixed to strip 70 such that its end surfaces 81 and 81a bear a fixed relation to surface 71. When switch 74 is closed by engagement with surface 81, switch 72 will have been opened by its finger 80 engaging surface 76 and the primary means will have come to rest at an intermediate point on the left side of, and approximately .030 inch from the final, selected location. The length of the cam 77 is critical, and must be such that switch 73 remains closed as the primary means arrives at the intermediate location and when switch 74 is initially closed by its engagement with surface 81. The reason for this critical relation will appear hereinafter in the description of the automatic operation of the apparatus.

Since a great many units 69 are employed in the practical embodiment of the invention, one for each location at which the primary means 10 is to be positioned, the selector or tertiary means SL is designed to render effective at the will of the operator, any one at a time of the units 69. It comprises a series of concentric current-carrying rings 82, 83 and 84 and a series of radially arranged sets of three contacts 85, 86 and 87, one set for each unit 69. A handle 88 may be employed having contacts that bridge the rings 82, 83 and 84 with their corresponding contacts in the sets 85, 86 and 87. It is entirely within the principles of the invention to operate the selector SL by any mechanism as well as manually, whether or not such operation is caused in a definite sequential order. Such devices may be hydraulic, electric or otherwise and they are all within the meaning of the expression "tertiary means for selecting" as used in the claims.

Within the automatic phase of the present invention, the primary means 10 is uni-directionally moved as rapidly as possible to the intermediate location from which it is moved relatively slowly to the final, selected location. Of course, if the primary means is located between the intermediate location and the final, selected location it moves only at a relatively slow speed to the latter. Furthermore, the intermediate location being always on one and the same side of the final location, movement to the final selected location is always in the same direction. These requirements involve means for effecting the movement of the primary means relatively rapidly in both directions and relatively slowly in only one. Relatively rapid movement of the primary means to the left is caused by de-energizing a normally-energized solenoid 89 for valve 31 thereby causing spring 90 to open valve 31 exhausting line 32 to port 90'. Similarly, relatively rapid movement of the primary means to the right is effected by de-energizing a normally-energized solenoid 91 of a valve 92, causing a spring 94 to open valve 92, exhausting line 40 past ball-check valve 93 to a port 95.

Relatively slow movement of the primary means 10 to the right is caused by de-energizing a solenoid 96, while solenoids 89 and 91 remain energized, causing a spring 97 to open valve 37 exhausting line 38 through a port 98. In order to control the rate of slow movement of means 10, a reducing valve RD is provided and comprises a body 99 having two chambers 100, 101 separated by a wall 102. A double headed piston 103 is adapted to be reciprocated within an opening in wall 102 and its heads 104, and 105 are respectively located within chambers 100, 101. A branch 106 from line 40 supplies liquid to the chamber 101 from which it bleeds through a line 107 to chamber 100 on the side of head 104 nearest wall 102. This causes piston 103 to move rightwardly against a spring 108 so that head 105 forms a crack opening with a seat 109. The liquid from chamber 101 passes to a conventional, commercial metering valve 110. In order for the valve 110 to meter exact quantities of oil from the right hand side of cylinder 12', so that the slow movement of the primary means is always at a constant pre-determined rate (necessary for extreme accuracies in repeatedly stopping at the same location), this valve must receive liquid at a substantially constant pressure. The head 105 normally just cracks the seat 109 and this supplies liquid to valve 110, and valve 110 meters the liquid at a pre-determined rate so that the pressure within chamber 101 remains at about 100 pounds per square inch. Should the pressure in chamber 101 fall below 100 pounds, spring 108 moves piston 103 leftwardly increasing the supply. Increase of the pressure in chamber 101 above 100 pounds causes head 104 to move rightwardly decreasing the flow of oil to chamber 101.

When a selection of one of the detector units 69 is made, by moving handle 88 manually in the present embodiment, a fourth means is operated, by a non-selective act involving identical action each time it is operated, which automatically selects and initiates the proper direction of motion of the primary means so that it initially moves uni-directionally to the intermediate location regardless of its previous position. This means in the present embodiment is a relay circuit R. It can best be understood by describing its operation, first with the primary means 10 initially on the right hand side of the final selected location as defined by surface 71; and thereafter with the primary means 10 initially on the left hand side of the final, selected location as defined by surface 71'.

Closing switch 111 energizes motor 20 causing pumps 21 and 26 to operate. It also energizes solenoids 89, 91 and 96 holding valves 31, 92 and 37 in the position shown so that liquid under equal pressure is admitted to both ends of cylinder 12'. Since piston 12 is not moved until circuit R is rendered effective, the pressure of the liquid in the system immediately builds up beyond the pre-determined pressure for which dump valve 24 is set causing it to shunt the liquid from pump 21 directly to the source S through line 25. The high pressure liquid passes through line 30, valve 31, line 32, valve 33 (in the position shown ball-check member 45 is held off its seat), thence through line 34 to cylinder 12' on the left hand side of piston 12. Liquid under pressure also flows through line 35, 36, valve 37, line 38, past check 39, through line 40 to valve 41 which also passes the liquid, in the position in which it is shown, to line 42 and the right hand side of cylinder 12'. Energizing the primary 112 of transformer 64 induces a current in its secondary 113 and normally-open pressure switch 114 closes after a pre-determined pressure develops in the system. This supplies electrical energy to the circuit R, but nothing occurs since all of the circuits of its control relays are open. With the handle of selector SL in the position shown, the detector unit 69 has been selected and the primary means 10 must move leftwardly to the intermediate location defined by switch 72 being on the opposite side of surface 71 from which it is initially. In the position shown, switch 72 is closed, switch 73 is closed and switch 74 is open. The condition of switch 73 is, at this instant, not critical. Switch 74, by construction, is always open when switch 72 is closed.

Closing push button switch 115 energizes control relay $CR_3$ which closes $CR_3$ switch 116 and opens $CR_3$ switch 117. With switch 72 closed, a circuit is established from ground through switch 72, a line 118, the outer contact of series 85, ring 82 and a line 119. Since $CR_3$ switch 117 is open, no short occurs, and with $CR_3$ switch 116 closed, the current passes through control relay $CR_1$, pressure switch 114 which is closed, thence through the secondary 113 to ground. Energizing control relay $CR_1$ closes $CR_1$ switch 120 energizing solenoid 60 thereby releasing the binding device 19. It also opens $CR_1$ switch 120' which de-energizes solenoid 89 permitting spring 90 to shift the spool of valve 31 rightwardly exhausting line 32 through port 90' and consequently cylinder 12' on the left side of piston 12. This causes piston 12 and the primary means 10 together with arm 75 to move leftwardly, and when said movement begins the pressure of the liquid in the system falls below the pre-determined pressure setting of dump valve 24 causing it to supply low pressure liquid in large quantities to the system thereby moving the primary means at a rapid rate leftwardly. When solenoid 89 is de-energized switch 121 closes establishing a holding circuit for control relay $CR_1$ after release of the push-button 115 and de-energization of control relay $CR_3$. This circuit extends from ground through switch 121, conductor 122, control relay $CR_1$, pressure switch 114, secondary 113 and ground.

Before switch 115 is released, however, and while control relay $CR_3$ is energized, $CR_3$ switch 123 closes energizing control relay $CR_4$ and $TD_1$ relay. Energizing control relay $CR_4$ closes $CR_4$ switch 124 holding control relay $CR_4$ and $TD_1$ relay energized after $CR_3$ switch 123 re-opens when push button 115 is released. Energization of relay $TD_1$ closes $TD_1$ switch 125, however, control relay $CR_2$ does not become energized because control relay $CR_1$ is still energized holding $CR_1$ switch 126 open.

Rapid leftward movement of the primary means 10 continues until switch 74 is closed by its cooperation with the end 81 of cam 77. This establishes a circuit from ground through switch 74, a line 126, ring 84, a line 127, solenoid 89, a line 128, line 63, secondary 113 and ground, thereby re-energizing solenoid 89. Re-energization of solenoid 89 moves valve 31 to the position shown stopping the leftward movement of the primary means 10 and opening switch 121, whereupon control relay $CR_1$ drops out and accordingly, $CR_1$ switch 120 opens permitting the binding device 19 to become effective.

Just as switch 74 closes, finger 80 of switch 72 contacts surface 76 so that the switch 72 opens when the primary means comes to rest and this position of rest is the intermediate location from which the primary means 10 is to be moved at a slow rate to the final location determined by surface 71. With the primary means 10 in the intermediate location, finger 79 will be a very short distance from surface 71 in the order of about .030 inch. Furthermore, with the primary means at this location, switches 73 and 74 will be closed since the length of cam 77 is such to insure this condition.

De-energization of control relay $CR_1$, as above described, permits $CR_1$ switch 126 to close energizing control relay $CR_2$ which opens $CR_2$ switch 129 de-energizing control relay $CR_4$ and $TD_1$ relay. It also opens $CR_2$ switches 130, 131 and closes $CR_2$ switch 131'. Closing $CR_2$ switch 131' energizes solenoid 60 releasing the binding device 19. Opening $CR_2$ switch 131 does not cause de-energization of solenoid 91 because when the primary is in the intermediate location switch 73 is closed maintaining a circuit from ground through switch 73, a line 132, the center contact of the group 85, ring 83, a line 133, solenoid 91, line 128, line 63, the secondary 113 to ground.

Opening $CR_2$ switch 130 de-energizes solenoid 96, so that spring 97 operates valve 37 to exhaust line 38 to port 98. Operation of valve 37 also closes a switch 134 for holding control relay $CR_2$ energized after $TD_1$ switch 125 opens. Opening of $TD_1$ switch 125 before closing of switch 134 will prevent the apparatus from functioning since it would cause control relay $CR_2$ to drop out and $CR_2$ switch 130 to close re-energizing solenoid 96. Accordingly $TD_1$ switch 125 is pre-set to open a sufficient time interval after $TD_1$ relay is de-energized to insure switch 134 having closed.

With solenoid 96 de-energized and solenoids 89 and 91 still energized, the primary means slowly moves rightwardly at a rate depending upon the rate at which valve 110 meters the liquid from the right hand end of cylinder 12'. Since this slow movement is occasioned with the liquid in the system under high pressure, any unfilled space between valves 93 and 92 would first be filled, causing movement of the primary means independently of the metering valve 110. In order to prevent any such action, a line 95' extending from line 35 to valve 92 will always keep this space completely filled and when metering through valve 110 occurs the high pressure in line 95' will maintain valve 93 closed. This slow rightward movement continues until the finger 79 engages the surface 71 whereupon further rightward movement of the primary means closes switch 72. Closing switch 72 establishes a circuit from ground through switch 72, line 118, ring 82, line 119, $CR_3$ switch 117, solenoid 96, line 63, secondary 113 to ground. Solenoid 96 is, therefore, re-energized moving the spool of valve 37 to cut off exhaust port 98 stopping the primary means at the final, selected location. Operation of valve 37 also opens switch 134 which de-energizes control relay $CR_2$ whereupon $CR_2$ switch 131' opens causing the binder 19 to hold the primary means in the final, selected location. It also causes $CR_2$ switches 130 and 131 to close maintaining solenoids 96 and 91 energized. The apparatus is then in condition to have another selection made by operating selector or tertiary means SL, and such new selection may be effected by the non-selective act of pushing button 115.

Assume the handle is moved counter-clockwise so that the group of contacts 86 becomes effective. This renders the detector unit 69' effective, and it is apparent from the drawing that the primary means is initially located to the left of the final, selected location defined by surface 71'. As shown switches 72' and 73' are open, while switch 74' is closed. The closed condition of switch 74', however, is not critical and may be open depending how far to the left of the final selected location the primary means 10 is initially located.

Pushing button 115 energizes relay $CR_3$ which closes $CR_3$ switch 123 thereby energizing control relay $CR_4$ and $TD_1$ relay. Energizing control relay $CR_4$ causes $CR_4$ switch 124 to close, holding control relay $CR_4$ and relay $TD_1$ through $CR_2$ switch 129. Energizing relay $TD_1$ closes $TD_1$ switch 125 energizing control relay $CR_2$ which opens $CR_2$ switches 130, 131 de-energizing solenoids 96 and 91 causing valves 37 and 92 to be operated to exhaust lines 38 and 40 respectively. At the same time, energizing control relay $CR_2$ opens $CR_2$ switch 129 de-energizing control relay $CR_4$ and relay $TD_1$. Should $TD_1$ switch 125 open before switch 134 closes when valve 37 is operated, control relay $CR_2$ would de-energize and cause $CR_2$ switches 130, 131 to close re-energizing solenoids 96 and 91, preventing movement of the primary means. Accordingly, $TD_1$ switch is set to open at a sufficient time interval after de-energization of $TD_1$ relay to insure prior closing of switch 134 which then maintains control relay $CR_2$ energized after $TD_1$ switch 125 opens.

Also, when control relay $CR_2$ is energized, $CR_2$ switch 131' closes energizing solenoid 60 thereby releasing binding device 19. Under these circumstances then, the right-hand end of cylinder 12' is exhausted through ports 95 and 98 of valves 92 and 37 so that the pressure of the liquid in the system decreases to the point where valve 24 supplies a large quantity of low-pressure liquid to the system rapidly moving the primary means 10 rightwardly. This rapid rightward movement continues until switch 73' is closed by its contacting end 81a' of cam 77'. Closing switch 73' establishes a circuit from ground through switch 73', a line 135, ring 83, line 133, solenoid 91, line 128, line 63, secondary 113 to ground, re-energizing solenoid 91 and operating valve 92 to cut off exhaust port 95. The primary means is now in the intermediate location where both switches 73' and 74' are closed and switch 72' is open with its finger 79' a short distance from surface 71'. Accordingly, solenoid 96 is the only one of the three 89, 91 and 96 that is still de-energized. This causes the primary means to move rightwardly slowly through the action of metering valve 110 exhausting the right side of cylinder 12' through the exhaust port 98. Slow rightward movement of the primary means continues until switch 72' is closed by its finger 79' cooperating with surface 71'. Closing switch 72' establishes a circuit from ground through switch 72', a line 136, ring 82, line 119, $CR_3$ switch 117, solenoid 96, line 63, secondary 113 to ground, re-energizing solenoid 96 and operating valve 37 to cut off exhaust 98 and open switch 134. Opening of switch 134 de-energizes control relay CR₂ so that CR₂ switch 131' opens permitting the binding device 19 to hold the primary means in the final, selected location until another selection is made by rotating handle 88 of selector SL and button 115 again pushed.

Should the primary means initially lie in a position between the intermediate location and the final, selected location, switches 73' and 74' would be closed while switch 72' would be open and, of course, the primary means would move to the final, selected location at the relatively slow speed.

Although the various features of the new and improved positioning apparatus have been shown and described in detail to fully disclose one embodiment of the invention, it will be evident that numerous changes may be made in such details and certain features may be used without others, without departing from the principles of the invention.

What is claimed is:

1. Apparatus comprising in combination, a primary means adapted automatically to be positioned at more than two locations, one at a time, along a path of travel; fluid-operated means for moving said primary means to said locations; a secondary means comprising a unit for each location, each unit including a locking switch and actuator relatively adjustable throughout the path of travel of said primary means for determining one of said locations at which said primary means is to be located; a tertiary means having a position for indicating each unit of said secondary means, and a member adapted to be located in any of said positions to determine the unit of the secondary means desired; and a fourth means for automatically selecting and initiating the correct direction of motion of the primary means to initially cause it to move toward the location determined by the unit of the secondary means selected by the tertiary means.

2. Apparatus comprising in combination, a primary means adapted automatically to be positioned at more than two locations, one at a time, along a path of travel; fluid-operated means for moving said primary means to said locations; a secondary means comprising a unit for each location, each unit including a locking switch and actuator relatively adjustable throughout the path of travel of said primary means for determining one of said locations at which said primary means is to be located; a tertiary means having a position for indicating each unit of said secondary means, and a member adapted to be located in any of said positions to determine the unit of the secondary means desired; and a fourth means requiring a non-selective act to initiate it and including means for automatically selecting and initiating the correct direction of motion of the primary means to initially cause it to move toward the location determined by the unit of the secondary means selected by the tertiary means.

3. Apparatus comprising in combination, a primary means adapted automatically to be positioned at more than two final locations, one at a time, along a path of travel; a secondary means comprising a unit for each position at which said primary means is to be located and including relatively adjustable elements for determining one of said final locations as well as a corresponding intermediate location, said intermediate location bearing a fixed relation to its corresponding final location; a tertiary means having a position for indicating each unit of the secondary means, and a member adapted to be located in any of said positions to determine the unit of the secondary means desired; and a fourth means for automatically causing said primary means, when it is not initially located between said intermediate and final locations, to move uni-directionally at a relatively rapid rate to said intermediate location regardless of the side of said final location on which said primary means initially is located, and thence at a relatively slow rate to the final location determined by the unit of the secondary means selected by the tertiary means.

4. Apparatus comprising in combination, a primary means adapted automatically to be positioned at more than two final locations, one at a time, along a path of travel; fluid-operated means for moving said primary means to said final locations; a secondary means comprising a unit for each position at which said primary means is to be located and including relatively adjustable elements for determining one of said final locations as well as a corresponding intermediate location, said intermediate location bearing a fixed relation to its corresponding final location; a tertiary means having a position for indicating each unit of the secondary means, and a member adapted to be located in any of said positions to determine the unit of the secondary means desired; and a fourth means for automatically causing said primary means, when it is not initially located between said intermediate and final locations, to move uni-directionally at a relatively rapid rate to said intermediate location regardless of the side of said final location on which said primary means initially is located, and thence at a relatively slow rate to the final location determined by the unit of the secondary means selected by the tertiary means.

5. Apparatus comprising in combination, a primary means adapted automatically to be positioned at more than two final locations, one at a time, along a path of travel; fluid-operated means for moving said primary means to said final locations; a secondary means comprising a unit for each position at which said primary means is to be located and including relatively adjustable elements for determining one of said final locations as well as a corresponding intermediate location, said intermediate location bearing a fixed relation to its corresponding final location; a tertiary means having a position for indicating each unit of the secondary means, and a member adapted to be located in any of said positions to determine the unit of the secondary means desired; and a fourth means requiring a non-selective act to initiate it and including means for automatically causing said primary means, when it is not between said intermediate and final locations, to move uni-directionally at a relatively rapid rate to said intermediate location regardless of the side of said final location on which said primary means initially is located, and thence at a relatively slow rate to the final location determined by the unit of the secondary means selected by the tertiary means.

6. Apparatus comprising in combination, primary means adapted automatically to be positioned at more than two final locations, one at a time, along a path of travel; secondary means including a unit for each position at which said primary means is to be located, each unit including relatively adjustable elements for determining one of the final locations of said primary means, as well as an intermediate location that is always on the same side of, and bears a fixed relation to said final location; tertiary means having a position for indicating each unit of the secondary means, and a member adapted to be located in any of said positions to determine the unit of the secondary means desired; means for initially causing said primary means to move at a relatively rapid rate to and beyond said final location to said intermediate location when said primary means is initially on the opposite side of said final, selected location from said intermediate location; means for initially causing said primary means to move uni-directionally at a relatively rapid rate to said intermediate location when said primary means initially is on the same side of said final location as said intermediate location and not between said intermediate and final locations; and means for moving said primary means from said intermediate location to said final, selected location at a relatively slow rate of speed.

7. Apparatus comprising in combination, primary means adapted automatically to be positioned at more than two final locations, one at a time, along a path of travel; a piston attached to said primary means; a cylinder within which said piston reciprocates; secondary means including a unit for each position at which said primary means is to be located, each unit including relatively adjustable elements for determining one of the final locations of said primary means, as well as an intermediate location that is always on the same side of, and bears a fixed relation to said final location; tertiary means having a position for indicating each unit of the secondary means, and a member adapted to be located in any of said positions to determine the unit of the secondary means desired; means for initially and relatively rapidly exhausting the end of the cylinder on the side of the final location as said intermediate location is located when said primary means is initially on the opposite side of said final location; means for initially and relatively rapidly exhausting the end of the cylinder on the opposite side of the final location from that of the intermediate location when the primary means initially is on the same side of the final location as the intermediate location and not between said intermediate and final locations; and means for exhausting the last-mentioned side of said cylinder at a relatively slow metered rate when said primary means is at said intermediate location, or between it and said final location.

8. Apparatus comprising in combination, primary means movable in two directions along a path of travel and adapted automatically to be positioned at a pre-determined location therealong; secondary means comprising a self-locking switch and switch-actuator relatively adjustable throughout the extent of travel of said primary means for determining said pre-determined location; and means requiring a non-selective act to initiate it and including means for automatically selecting and initiating the correct direction of motion of said primary means initially to cause it to move in the correct direction toward said pre-determined location.

9. Apparatus comprising in combination, primary means movable in two directions along a path of travel and adapted automatically to be positioned at a pre-determined location therealong; a piston attached to said primary means; a cylinder within which said piston is adapted to be reciprocated; means normally maintaining fluid under pressure on each side of said piston; secondary means comprising a self-locking switch and switch-actuator relatively adjustable throughout the extent of travel of said primary means for determining said pre-determined location; and means for exhausting either end of said cylinder depending upon whether said self-locking switch is open or closed.

10. Apparatus comprising in combination, a primary means movable in two directions along a path of travel and adapted automatically to be positioned at a pre-determined location therealong; secondary means comprising relatively adjustable elements for determining said pre-determined location as well as an intermediate location, said intermediate location bearing a fixed relation to said pre-determined location; and means for automatically selecting and initiating the correct direction of motion of said primary means when it initially does not lie between said intermediate and pre-determined locations, to cause it to move uni-directionally at a relatively rapid rate to said intermediate location regardless of the side of said pre-determined location on which said primary means is initially located, and thence at a relatively slow rate to said pre-determined location.

11. Apparatus comprising in combination, a primary means movable in two directions along a path of travel and adapted automatically to be positioned at a pre-determined location therealong; a piston attached to said primary means; a cylinder within which said piston is adapted to be reciprocated; means normally maintaining fluid under pressure on each side of said piston; secondary means comprising relatively adjustable elements for determining said pre-determined location as well as an intermediate location, said intermediate location bearing a fixed relation to said pre-determined location; and means adapted upon being rendered effective to cause the exhausting of either end of said cylinder in accordance with the initial location of said primary means so that said primary means, when it is not initially located between said intermediate and pre-determined locations, moves uni-directionally at a relatively rapid rate of movement to said intermediate location regardless of the side of said pre-determined location on which said primary means is initially located, and thence at a relatively slow rate of movement to said pre-determined location.

12. Apparatus comprising in combination, a primary means movable in two directions along a path of travel and adapted automatically to be positioned at a pre-determined location therealong; means for moving said primary means; a self-locking switch for determining the initial direction of motion of the primary means as well as said pre-determined location; separate self-returning switches for each direction of motion of said primary means for determining an intermediate location thereof that bears a fixed relation to said predetermined location; an actuator for said switches, adjustable relatively thereto throughout the extent of movement of said primary means; and means controlled by said switches for causing said primary means to move, when said primary means is not initially located between said intermediate and pre-determined locations, uni-directionally at a relatively rapid rate of movement to said intermediate location regardless of the side of said pre-determined location on which said primary means is initially located, and thence at a relatively slow rate to said pre-determined location.

13. Apparatus comprising in combination, a primary means movable in two directions along a path of travel and adapted automatically to be positioned at a pre-determined location therealong; a piston attached to said primary means; a cylinder within which said piston is adapted to be reciprocated; means normally maintained fluid under pressure on each side of said piston a self-locking switch for determining the initial direction of motion of the primary means as well as the pre-determined location thereof; separate self-returning switches for each direction of motion of said primary means for determining an intermediate location thereof that bears a fixed relation to said pre-determined location; an actuator for said switches, adjustable relatively thereto throughout the extent of movement of said primary means; and means controlled by said switches for exhausting either end of said cylinder so that said primary means, when it does not lie between said intermediate and pre-determined locations, moves uni-directionally at a relatively rapid rate to said intermediate location regardless of the side of said pre-determined location on which said primary means is initially located, and thence at a relatively slow rate to said pre-determined location.

14. Apparatus comprising in combination, a primary means adapted automatically to be positioned at more than two final locations, one at a time, along a path of travel; secondary means comprising a unit for each location at which said primary means is to be located, each unit including a self-locking switch for determining the initial direction of motion of the primary means as well as one of said final locations, and separate self-returning switches for each direction of motion of said primary means for determining an intermediate location that bears a fixed relation to said final location; an actuator for each unit adapted to be adjusted relatively to its corresponding switches throughout the extent of travel of said primary means; tertiary means having a position for indicating each unit of said secondary means, and a member adapted to be located in any of said positions to determine the unit of the secondary means desired; a relay circuit adapted when rendered effective to cause said primary means, when it does not initially lie between said intermediate and final locations, to move uni-directionally at a relatively rapid rate toward said intermediate location regardless of the side of said final location on which said primary means is initially located and until the intermediate switch corresponding to the direction of motion of the primary means is closed; and a relay circuit rendered effective by the closing of said corresponding intermediate switch for causing said primary means to move at a relatively slow rate until said final location switch is closed.

15. Apparatus comprising in combination, a primary means adapted automatically to be positioned at more than two final locations, one at a time, along a path of travel; a piston connected to said primary means; a cylinder within which said piston is adapted to be reciprocated; a source of fluid pressure acting on opposite sides of said piston; secondary means comprising a unit for each location at which said primary means is to be located, each unit including a self-locking switch for determining the initial direction of motion of the primary means as well as one of said final locations, and separate self-returning switches for each direction of motion of said primary means for determining an intermediate location that bears a fixed relation to said final location; an actuator for each unit adapted to be adjusted relatively to its corresponding switches throughout the extent of travel of said primary means; tertiary means having a position for indicating each unit of said secondary means, and a member adapted to be located in any of said positions to determine the unit of the secondary means desired; a relay circuit adapted when rendered effective to exhaust at a relatively rapid rate one of the sides of said cylinder, when said primary means initially does not lie between said intermediate and final locations, so that said primary means moves uni-directionally to said intermediate location regardless of the side of the final location on which said primary means initially is located, and until the intermediate switch corresponding to the direction of motion is closed; and a relay circuit rendered effective by the closing of said corresponding intermediate switch for exhausting said cylinder at a metered rate so that said primary means moves relatively slowly to said final location.

16. Apparatus comprising in combination, a primary means movable in two directions along a path of travel and adapted automatically to be positioned at a pre-determined final location therealong; means for moving said primary means; a self-locking switch for determining the initial direction of motion of the primary means as well as said pre-determined location, and separate self-returning switches for each direction of motion of said primary means for determining an intermediate location that bears a fixed relation to said pre-determined location; an actuator adapted to be adjusted relatively to said switches throughout the extent of travel of said primary means; a relay circuit adapted to be rendered effective by a non-selective act to cause said primary means, when it is initially not between said intermediate and final locations, to move at a relatively rapid rate in one direction when said self-locking switch is open until the self-returning switch corresponding to the direction of movement closes; a relay circuit adapted to be rendered effective by said non-selective act to cause said primary means to move at a relatively rapid rate in the opposite direction when said self-locking switch is closed until the other self-returning switch closes; and a relay circuit rendered effective by the closing of the self-returning switch corresponding to the direction of the relatively rapid movement of the primary means for causing said primary means to move at a relatively slow rate to said pre-determined location.

17. Apparatus comprising in combination, a primary means movable in two directions along a path of travel and adapted automatically to be positioned at a pre-determined location therealong; a piston attached to said primary means; a cylinder within which said piston is adapted to reciprocate; a source of fluid under pressure normally acting on both sides of said piston; separate solenoid-operated valves for each end of said cylinder for controlling the rapid rate of exhaust of fluid therefrom; another solenoid-operated valve for controlling a metered rate of exhausting one end of said cylinder; a self-locking switch for determining the initial direction of motion of said primary means as well as said pre-determined location; separate self-returning switches for each direction of motion of said primary means for determining an intermediate location that bears a fixed relation to said pre-determined location; an actuator adapted to be adjusted relatively to said switches throughout the extent of travel of said primary means; a relay circuit adapted to be rendered effective by a non-selective act to operate one of said rapid rate solenoid valves, when the primary means initially is not located between said intermediate and pre-determined locations, and when said self-locking switch is open until the self-returning switch corresponding to the direction of movement closes; a relay circuit adapted to be rendered effective by said non-selective act to operate the other of said rapid-rate solenoid valves when said self-locking switch is closed until the other of said self-returning switches closes; and a relay circuit rendered effective upon the closing of the self-returning switch corresponding to the direction of the relatively rapid movement of the primary means for operating said metered-rate solenoid valve until said primary means reaches said pre-determined location.

18. In a positioning apparatus for a machine tool, a support adapted automatically to be positioned at more than two locations, one at a time, along a path of travel; a piston connected to said support; a cylinder within which each piston is adapted to be reciprocated; fluid under pressure normally acting on each side of said piston; a detector comprising a unit for each position to which said support is to be located, each unit including a self-locking switch and a switch actuator relatively adjustable throughout the extent of the path of travel of said support; a selector for determining the unit of the detector desired; and a control relay circuit adapted to be rendered effective by a non-selective act for causing the exhausting of the correct end of said cylinder to cause said support to move toward the selected location in accordance with the setting of the unit of the detector selected by the selector.

19. In a positioning apparatus for a machine tool, a support adapted automatically to be positioned at more than two final locations, one at a time, along a path of travel; a detector comprising a unit for each position to which said support is to be located, each unit including a self-locking switch for determining the initial direction of motion of the support as well as one of said final locations; separate self-returning switches for each direction of motion of said support for determining an intermediate location that bears a fixed relation to said final location; an actuator for each unit adapted to be adjusted relatively to its corresponding switches throughout the extent of travel of said support; a selector for determining the unit of the detector desired; a control relay circuit adapted when rendered effective, when said support is not initially located between said intermediate and final locations, to cause uni-directional movement of said support to said intermediate location regardless of the side of the final location on which said support initially is located, and until the self-returning switch corresponding to the direction of motion is closed; and a control relay circuit adapted to be rendered effective when said corresponding self-returning switch closes to cause said support to move at a relatively slow rate to said final, selected location.

20. In a positioning apparatus for a machine tool, a support adapted automatically to be positioned at more than two final locations, one at a time, along a path of travel; a piston connected to said support; a cylinder within which said piston is adapted to be reciprocated; a source of fluid under pressure adapted normally to act on each side of said piston providing a fluid-locked system; a detector comprising a unit for each position to which said support is to be located, each unit including a self-locking switch for determining the initial direction of motion of the support as well as one of said final locations; separate self-returning switches for each direction of motion of said support for determining an intermediate location that bears a fixed relation to said final location; an actuator for each unit adapted to be adjusted relatively to its corresponding switches throughout the extent of travel of said support; a selector for determining the unit of the detector desired; a control relay circuit adapted when rendered effective, when said support is not initially located between said intermediate and final locations, to exhaust said cylinder at a relatively rapid rate to cause uni-directional movement of said support to said intermediate location regardless of the side of the final location on which said support initially is located, and until the self-returning switch corresponding to the direction of motion is closed; and a control relay circuit adapted to be rendered effective when said corresponding self-returning switch closes to exhaust said cylinder at a relatively slow metered rate so that said support moves at a relatively slow speed from said intermediate location to said final, selected location.

21. In a positioning apparatus for a machine tool, a support movable in two directions along a path of travel and adapted automatically to be positioned at a pre-determined location therealong; a self-locking switch for determining the initial direction of motion of said support as well as the pre-determined location; an actuator for said switch relatively adjustable thereto throughout the extent of the travel of said support; and a relay circuit adapted when rendered effective by a non-selective act automatically to select and initially cause said support to move in the correct direction toward said pre-determined location.

22. In a positioning apparatus for a machine tool, a support movable in two directions along a path of travel and adapted automatically to be positioned at a pre-determined location therealong; a piston connected to said support; a cylinder within which said piston is adapted to be reciprocated; a source of fluid pressure normally acting on each side of said piston; a self-locking switch for determining the initial direction of motion of said support as well as the pre-determined location; an actuator for said switch relatively adjustable thereto throughout the extent of the travel of said support; and a relay circuit adapted when rendered effective by a non-selective act to exhaust said cylinder to cause said support initially to move in the correct direction toward said pre-determined location.

23. In a positioning apparatus for a machine tool, a support movable in two directions along a path of travel and adapted automatically to be positioned as a pre-determined location therealong; a detector comprising a circuit-making and breaking elements adjustable throughout the entire extent of the path of travel of said support for determining said predetermined location as well as an intermediate location which latter bears a fixed relation to said pre-determining location; a relay circuit adapted when rendered effective automatically to select and initiate the correct direction of motion of said support, when it initially does not lie between said intermediate and pre-determined locations, to cause said support to move uni-directionally at a relatively rapid speed to said intermediate location, regardless of the side of said pre-determined location on which said support is initially located; and a relay circuit automatically rendered effective upon said support arriving at said intermediate location for causing it to move at a relatively slow rate to said pre-determined location.

24. In a positioning apparatus for a machine tool, a support movable in two directions along a path of travel and adapted automatically to be positioned at a pre-determined location therealong; a self-locking switch for determining the initial direction of motion of said support as well as said pre-determined location; separate self-returning switches for each direction of motion of said support for determining an intermediate location thereof that bears a fixed relation to said pre-determined location; an actuator for said switches, adjustable relatively thereto throughout the extent of movement of said support; a relay circuit adapted when rendered effective automatically to select and initiate the correct direction of motion of said support, when it initially does not lie between said intermediate and pre-determined locations, to cause said support to move uni-directionally at a relatively rapid speed to said intermediate location, regardless of the side of said pre-determined location on which said support initially is located; and a relay circuit automatically rendered effective upon said support arriving at said intermediate location for causing it to move at a relatively slow rate to said pre-determined location.

25. In a positioning apparatus for a machine tool, a support movable in two directions along a path of travel and adapted automatically to be positioned at a pre-determined location therealong; a piston connected to said support; a cylinder within which said piston is adapted to be reciprocated; a source of fluid under pressure normally acting on opposite faces of said piston; a self-locking switch for determining the initial direction of motion of said support as well as said pre-determined location; separate self-returning switches for each direction of motion of said support for determining an intermediate location thereof that bears a fixed relation to said pre-determined location; an actuator for said switches, adjustable relatively thereto throughout the extent of movement of said support; a relay circuit adapted when rendered effective automatically to exhaust the correct side of said cylinder so that said support, when it initially does not lie between said intermediate and pre-determined locations, moves uni-directionally at a relatively rapid rate to said intermediate location regardless of the side of said pre-determined location on which said support is initially located; and a relay circuit automatically rendered effective upon said support arriving at said intermediate location for exhausting said cylinder at a relatively slow metered rate to cause said support to move at a relatively slow rate to said pre-determined location.

26. In a positioning apparatus for a machine tool, a support; a piston connected to said support; a cylinder within which said support is adapted to be reciprocated; a source of liquid under pressure normally acting on each side of said piston and providing a liquid-locked system; manually-operable valve means, connected between said source and each end of said cylinder, and adapted to exhaust either end of said cylinder at any desired rate; automatically-operable exhaust valves for each end of said cylinder, between said sources and said manually-operable valve means; means associated with said manually-operable valve means for isolating said automatically-operable valves when said manually-operable valve means is rendered effective, and for rendering said automatically-operable valves effective when said manually-operable valve means is ineffective; a detector including circuit making and breaking elements relative adjustable throughout the extent of travel of said support for determining a pre-determined location therealong at which said support is adapted to be located; and a control relay circuit adapted to render effective said automatically-operable exhaust valves in accordance with a pre-determined sequential order, to cause said support initially to move in the correct direction toward said predetermined location.

27. In a positioning apparatus for a machine tool, a support; a piston connected to said support; a cylinder within which said piston is adapted to be reciprocated; a source of liquid under pressure normally acting on each side of said piston and providing a liquid-locked system; manually-operable valve means, connected between said source and each end of said cylinder, and adapted to exhaust either end of said cylinder at any desired rate; automatically-operable exhaust valves for each end of said cylinder, between said source and said manually-operable valve means; means associated with said manually-operable valve means for isolating said automatically-operable valves when said manually-operable valve means is rendered effective, and for rendering said automatically-operable valves effective when said manually-operable valve means is ineffective; a detector including a plurality of units, one for each of a plurality of selected positions at which said support is to be located along its path of travel; a self-locking switch for each unit for determining the initial direction of motion of said support as well as one of said selected locations; separate self-returning switches for each direction of motion of said support for determining an intermediate location for said support that bears a fixed relation to said selected location; an actuator for the switches of each unit adjustable relatively thereto throughout the extent of travel of the support; a relay circuit adapted upon being rendered effective to operate one of said automatically-operable valves to exhaust said cylinder, when said support is not initially located between said intermediate and selected locations, to effect relatively rapid uni-directional movement of said support to said intermediate location regardless of the side of said selected location on which said support is initially located; and a relay circuit rendered effective upon said support arriving at said intermediate location for operating another one of said automatically-operable valves to exhaust said cylinder at a metered rate until said support arrives at said selected location.

28. Apparatus comprising in combination, a primary means adapted automatically to be positioned at more than two locations, one at a time, along a path of travel; fluid-operated means for moving said primary means to said locations; a secondary means comprising a unit for each location, each unit including a locking switch and actuator relatively adjustable throughout the path of travel of said primary means for determining one of said locations at which said primary means is to be located; a tertiary means having a position for indicating each unit of said secondary means, and a member adapted to be located in any of said positions to determine the unit of the secondary means desired; and means for initiating the movement of the primary means to initially cause it to move toward the location determined by the unit of the secondary means selected by the tertiary means.

29. Apparatus comprising in combination, a primary means adapted automatically to be positioned at more than two final locations, one at a time, along a path of travel; fluid-operated means for moving said primary means to said final locations; a secondary means comprising a unit for each position at which said primary means is to be located and including relatively adjustable elements for determining one of said final locations as well as a corresponding intermediate location, said intermediate location bearing a fixed relation to its corresponding final location; a tertiary means having a position for indicating each unit of the secondary means, and a member adapted to be located in any of said positions to determine the unit of the secondary means desired; means for causing said primary means to move at a relatively rapid rate to said intermediate location; and means for causing said primary means to move at a relatively slow rate from said intermediate location to the final location determined by the unit of the secondary means selected by the tertiary means.

30. In a positioning apparatus for a machine tool, a support adapted automatically to be positioned at more than two locations, one at a time, along a path of travel; a piston connected to said support; a cylinder within which said piston is adapted to be reciprocated; fluid under pressure normally acting on each side of said piston; a detector comprising a unit for each position to which said support is to be located, each unit including a self-locking switch and a switch actuator relatively adjustable throughout the extent of the path of travel of said support; a selector for determining the unit of the detector desired; and means for causing the exhausting of the correct end of said cylinder to cause said support initially to move toward the selected location in accordance with the setting of the unit of the detector selected by the selector.

31. In a positioning apparatus for a machine tool, a support adapted automatically to be positioned at more than two final locations, one at a time, along a path of travel; a detector comprising a unit for each position to which said support is to be located, each unit including a self-locking switch for determining the initial direction of motion of the support as well as one of said final locations; separate self-returning switches for each direction of motion of said support for determining an intermediate location that bears a fixed relation to said final location; an actuator for each unit adapted to be adjusted relatively to its corresponding switches throughout the extent of travel of said support; a selector for determining the unit of the detector desired; means for causing said support to be moved at a relatively rapid rate to said intermediate location and until the self-returning switch corresponding to the direction of motion is closed; and means for causing said support to move at a relatively slow rate from said intermediate location to said final, selected location.

EDWARD P. BULLARD, III.

REFERENCES CITED

The following references are of record in the file of this patent:

UNITED STATES PATENTS

| Number | Name | Date |
|---|---|---|
| 1,911,138 | Clute et al. | May 23, 1933 |
| 2,000,553 | Alden | May 7, 1935 |
| 2,073,518 | Hirvonen | Mar. 9, 1937 |
| 2,324,727 | Shartle | July 20, 1943 |
| 2,424,138 | Barr | July 15, 1947 |

Certificate of Correction

Patent No. 2,500,797 March 14, 1950

EDWARD P. BULLARD, III

It is hereby certified that errors appear in the printed specification of the above numbered patent requiring correction as follows:

Column 15, line 9, for the word "maintained" read *maintaining*; column 18, line 69, for "positioned as" read *positioned at*; column 19, line 1, for the syllable "ing" read *ed*;

and that the said Letters Patent should be read with these corrections therein that the same may conform to the record of the case in the Patent Office.

Signed and sealed this 25th day of July, A. D. 1950.

[SEAL]

THOMAS F. MURPHY,
*Assistant Commissioner of Patents.*